United States Patent
Heuft et al.

(10) Patent No.: US 6,732,921 B1
(45) Date of Patent: May 11, 2004

(54) SYSTEM FOR MANAGING A LARGE NUMBER OF REUSABLE AND RETURNABLE CONTAINERS AND CODE ESPECIALLY USEFUL FOR THIS PURPOSE

(75) Inventors: Bernhard Heuft, Burgbrohl (DE); Friedrich Wehren, Kempenich (DE)

(73) Assignee: Heuft Systemtechnik GmbH, Burgbroho (DE)

( * ) Notice: Subject to any disclaimer, the term of this patent is extended or adjusted under 35 U.S.C. 154(b) by 0 days.

(21) Appl. No.: 09/890,082

(22) PCT Filed: Jan. 31, 2000

(86) PCT No.: PCT/EP00/00730

§ 371 (c)(1), (2), (4) Date: Jul. 25, 2001

(87) PCT Pub. No.: WO00/45309

PCT Pub. Date: Aug. 3, 2000

(30) Foreign Application Priority Data

Jan. 29, 1999 (DE) .......................................... 199 03 586

(51) Int. Cl.[7] ................................................. G06F 7/08
(52) U.S. Cl. .................... 235/381; 235/375; 235/380; 235/383; 235/454; 235/494; 382/142; 382/143
(58) Field of Search ................................. 235/375, 383, 235/454, 494, 380; 382/142, 143; 209/522

(56) References Cited

U.S. PATENT DOCUMENTS

| | | | |
|---|---|---|---|
| 4,852,415 A | | 8/1989 | Bogatzki et al. |
| 5,206,496 A | | 4/1993 | Clement et al. |
| 5,357,095 A | * | 10/1994 | Weyrauch et al. .......... 235/494 |
| 5,566,066 A | * | 10/1996 | Weitzman et al. ............ 705/10 |
| 5,612,525 A | * | 3/1997 | Apter et al. ................. 235/375 |
| 5,699,162 A | * | 12/1997 | Pirani et al. ................. 356/427 |
| 5,699,525 A | * | 12/1997 | Embutsu et al. ................ 705/7 |
| 5,718,457 A | | 2/1998 | Weinstock |
| 6,092,726 A | * | 7/2000 | Toussant et al. ............ 235/383 |
| 6,321,983 B1 | * | 11/2001 | Katayanagi et al. ........ 235/380 |
| 6,390,368 B1 | * | 5/2002 | Edwards ..................... 235/456 |

FOREIGN PATENT DOCUMENTS

| | | | |
|---|---|---|---|
| DE | 3722422 A1 | 8/1989 | |
| DE | 3914440 A1 | 11/1989 | |
| DE | 4131881 A1 | 7/1992 | |
| DE | 4107012 A1 | 9/1992 | |
| DE | 4126626 C2 | 4/1993 | |
| DE | 4237577 A1 | 5/1993 | |
| DE | 29513600 U1 | 8/1995 | |
| EP | 0255861 A2 | 2/1988 | |
| EP | 0591615 A2 | 4/1994 | |
| GB | 2326003 A * | 12/1998 | .......... G06K/19/06 |

* cited by examiner

*Primary Examiner*—Michael G. Lee
*Assistant Examiner*—Ahshik Kim
(74) *Attorney, Agent, or Firm*—Gardner Carton & Douglas LLP

(57) ABSTRACT

In the system for managing a large number of reusable multi-trip receptacles each of which is marked by a code in an identifiable manner, the multi-trip receptacles are used in a number of cycles in several local stations (20, 21, 22) separated from each other and the code is read at each cycle. Data which have been recorded in the local stations. (20, 21, 22) for the individual multi-trip receptacles are stored allocated to the read code in a central station (10), and are evaluated to establish the number of cycles or uses of each multi-trip receptacle. The age and number of uses of each multi-trip receptacle is established using the data stored in the central station (10) and when a certain age or a certain number of cycles is reached, the local stations (20, 21, 22) are informed that the relevant multi-trip receptacle is no longer to be used.

11 Claims, 3 Drawing Sheets

Code Structure

Representation of digits 0 to 11 in the duodecimal system

■ = placed dot

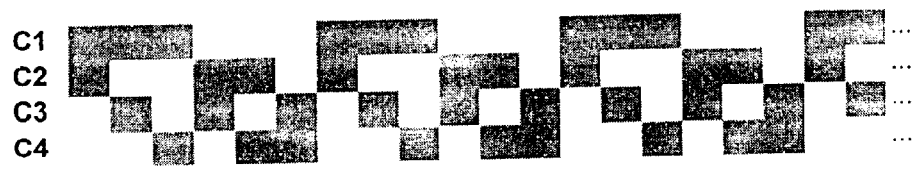

ized manner, the multi-trip receptacles being used in a number of cycles in several local stations separated from each other and the code being read at each cycle.

SYSTEM FOR MANAGING A LARGE NUMBER OF REUSABLE AND RETURNABLE CONTAINERS AND CODE ESPECIALLY USEFUL FOR THIS PURPOSE

FIELD OF THE INVENTION

The invention relates to a system for managing a large number of reusable multi-trip receptacles each of which is marked by a code in an identifiable manner, the multi-trip receptacles being used in a number of cycles in several local stations separated from each other and the code being read at each cycle.

The invention furthermore relates to a code which is particularly suitable for this system for managing a large number of reusable multi-trip receptacles, the coding elements being able to be placed only at positions which are arranged in a grid.

The multi-trip receptacles can be transport means or containers, in particular reusable drinks bottles.

BACKGROUND OF THE INVENTION

In the drinks industry, the same type of drinks bottles, so-called pool bottles, are used by several drinks bottling plants which together form a so-called pool. These are multi-trip bottles. The use of the same type of bottle by several drinks bottlers simplifies the return and re-use of the empty bottles for the consumer and the drinks bottlers. In the case of glass bottles, this system has proved successful for many years, and the bottles are reused on average thirty times or more and have a usage life of many years.

For some time, reusable plastic bottles have also been on the market. Plastic bottles have a softer surface than glass bottles and therefore scratch more easily, so that they become unsightly after approx fifteen cycles or uses. In addition, they are not as dimensionally stable as glass bottles and shrink slightly over time, so that they no longer have the quoted capacity. It is therefore necessary to limit the number of times they are re used and the overall usage life of such plastic bottles.

It is known to code the bottles with a 28-bit code which amongst other things gives the manufacturer and the date of manufacture. This code is read at each cycle, i.e. before each use of the bottle, and when a certain usage life is exceeded, the bottle is removed and destroyed.

A laser coding is also known in which each bottle is marked on the side upon each use using a laser beam, the height of the mark giving the number of uses. Each time the bottle is used, the mark applied the previous time is read or recorded, and a new mark is applied at a certain distance above it. This mark consists of a small welding point produced using the laser beam. Only the number of uses or cycles can be established by means of this mark, but not the age of the bottle. In addition, the welding point interferes when inspecting empty bottles with a CCD camera, as it can easily be taken for a foreign body. A further disadvantage of this mark is that it can be easily missed or its reading suppressed, so that unsightly bottles are then in the cycle and in addition the task of disposing of the bottle is passed onto the next user. Finally, each drinks bottling station must be equipped with a laser for applying the mark.

A process for filling multi-trip receptacles with a liquid product is known from DE-A-41 21 881 in which the containers are provided with a code before being filled. Before filling, the correctness of the code is tested. The code consists of a code body which can be attached to the bottom of the container. The code body has a number of vertical holes which are scanned by pins of the code-reading device.

A device for marking containers with a replenishing and refilling code is known from DE-A-42 37 517, the codes that are already present being recorded and the container being rotated such that the additional refilling code to be applied does not cover the already present refilling codes or overlap with them. The refilling codes are applied to the plastic containers by means of a laser marking system. The laser beam is shaped by a mask.

The application of an optically readable code mark on a plastic bottle using a laser beam is known from DE-A-41 07 012. The laser beam is directed onto a horizontal surface of the bottle, e.g. the support ring or the base surface at an angle of 7 to 15° to the axis of the plastic bottle. The code mark can be formed from linear or punctiform indentations which can be applied laterally in sequence.

It is known from DE-C-41 26 626 to provide a plastic bottle under the surface with a mark by focussing a Laser beam on a point which lies inside the wall material of the relevant surfaces.

An optical-electrical sensor for reading a bottle code mark is known from DE-A-37 22 422, which consists of raised points or lines. By means of an optical fiber, a light beam is directed onto the code mark and the reflected light directed to a photoelectric receiver.

A control system for the recognition, counting, logging and recording of various uses in a bottling plant is known from DE-U-295 13 600, the whole bottling process being controlled via a central unit.

The object of the invention is to create a system for managing a large number of reusable multi-trip receptacles which, by simple means, facilitates a limitation of the number of uses or cycles of each individual multi-trip receptacle.

SUMMARY OF THE INVENTION

This object is achieved according to the invention in that data which have been recorded in the local stations for the individual multi-trip receptacle are stored allocated to the read code in a central station, and are evaluated to establish the number of cycles or uses of each multi-trip receptacle.

Preferably the age of each multi-trip receptacle is also established using the data stored in the central station. When a certain age or a certain number of uses is reached, the local stations are informed that the multi-trip receptacle in question is no longer to be used. To this end, each local station contains a memory in which the code of those multi-trip containers which are no longer to be used is stored. Each bottle is identified before filling, using the code, and the read code is compared with the stored codes of the multi-trip receptacles no longer to be used. If necessary, the multi-trip receptacle is then removed.

With the system according to the invention, the data transfer between the stations and the central station occurs expediently at regular intervals, e.g. daily or weekly. The time interval is to be shorter than half of the shortest time interval to be expected between two successive uses of the same multi-trip receptacle. This ensures that no multi-trip receptacle is used too often simply because the data in the central station have not been updated.

Before or during the first use of a new multi-trip receptacle, the following information is preferably stored by the central station in combination with the code, and these data are stored allocated to the code, in the central station:

the date of manufacture, the manufacturer, the local station in which the new multi-trip receptacle is used for the first time.

Preferably, the data stored in the central station at each cycle, allocated to the code of each multi-trip receptacle, contain one or more of the following details:

the contents, e.g. the drink bottled the date on which the multi-trip receptacle was recorded in the local stations, i.e. the current date, the local station in which the multi-trip receptacle is currently recorded.

The recording of the contents is advantageous in particular for plastic drinks bottles as these bottles preserve the taste of the drink, e.g. of a bottled fruit juice If water is bottled the next time the bottle is used, the water will still taste of this fruit juice. Through the process according to the invention, it can be ensured that only bottles in which no flavouring-containing drink was previously bottled are used for water.

Using the data stored in the central station before or during the first use, and the data added to this during each cycle, the following values can be established for each multi-trip receptacle through the evaluation of these data in the central station:

the age, the number of uses, the number of uses or passages in a particular local station.

The whole history of the multi-trip receptacle emerges from these data. Much more detailed charging and pool management procedures are thereby facilitated. For example, in the case of drinks bottles, the individual bottling companies can be charged the manufacturing and disposal costs according to the actual number of times a drinks bottle has been used. Although the bottle type is always the same, it can be ensured that only the same drink product is always bottled in a bottle.

Overall, in addition to the recording of the features already mentioned, namely age and number of uses, the following possibilities result from the evaluation in the central station:

Recording by manufacturer,

Recording by contents, e.g. drink types,

Tracking the life-cycle (last user or filler),

Recording the plant which supplied a particular multi-trip receptacle, and the number of multi-trip receptacles supplied by a particular plant, Recording the plant which removed and destroyed a particular multi-trip receptacle, and the total number of these multi-trip receptacles, Monitoring destruction, Monitoring the pool for foreign multi-trip receptacles which have been smuggled in.

Furthermore, on the basis of these data, local statistics and product tracking can be provided without additional outlay on identification. The following further possibilities result from the evaluation in the local station:

Removal, recording and detection by the number of cycles, by age and other criteria, Recording of internal data, product lines, time of use and batch, Evaluation of own cycle by share, cycle time etc.

The centrally managed data can be coupled by means of fuzzy logic with data which are currently being recorded in the local station. Drinks bottles can be inspected e.g. visually, or examined for shrinkage, scratches or tarnishing of the material, and the decision as to whether the bottle is removed can be made taking account of all of these parameters.

A further advantage of the system is that each local station requires only a reading device, but not a writing or marking device (laser).

The multi-trip receptacles can also each carry a transponder chip which contains the code. Data for each multi-trip receptacle can then be stored in its own transponder chip.

The system can also be used for simultaneous management of different types of multi-trip receptacles, in particular bottle types. The code can give the type of multi-trip receptacle, e.g. the bottle type.

As, through the process according to the invention, the movement flows of the multi-trip receptacles can be accurately copied for the first time, reliable statements on the environmental pollution caused by different systems of multi-trip receptacles can be made using these data. In particular, the transport routes can be taken into account.

Avoidance of this system of recording each multi-trip receptacle during each cycle is hardly possible, as the code is read upon each use of a container, to ensure that it is the correct type of receptacle (bottle type). Avoidance is also largely unattractive as each user (bottling plant) is charged anyway with the costs only according to his share of the use of the multi-trip receptacles (bottles).

The system is secured against an unauthorized supply of multi-trip receptacles not belonging to the pool, as duplicates of codes or not yet issued or allocated codes would be recognized immediately. In particular, the cumulative occurrence of such multi-trip receptacles with one particular user can be established on the basis of the stored data.

A 32-bit code should suffice to be able to identify all multi-trip receptacles using the code. $2^{32}$ ($\approx$4 billion) multi-trip receptacles can be distinguished with it. The code can consist of a continuous numbering of the bottles. The reading reliability can be improved by algorithms, redundancy, parity or recovery bits.

The code can be constructed so that at least the approximate manufacturing date of the multi-trip receptacle can be established from it directly, i.e. without recourse to the data stored in the central station multi-trip receptacles which exceed a particular age can then—as previously—be removed immediately without waiting first for the signal from the central station. This signal would lead to the removal of the multi-trip receptacle only when it is next used.

In the case of containers, the code can be a bar code. In particular in the case of drinks bottles, the code can be located on the base of the bottle and the code can be read upon inspection of the bottom of the bottle. Alternatively, the code can also be applied at the mouth ring or at the carrying ring of the bottles, the advantage of universal readability then obtaining. The code can also be applied to the side wall and can be read upon inspection of the side wall.

The code must be extremely durable and is therefore expediently etched into the plastic material of the bottle using a laser. In the case of plastic bottles, the code can also consist of a pattern of fields with different molecular orientation of the material. Such a molecular orientation can be produced when embossing plastic bottles by cooling under tension, e.g. by means of Peltier elements. Such a pattern could then be recognised only in polarized light. For containers made of metal, the individual fields can also be differently magnetized (magnet code). The code can be read by means of a CCD camera and usual evaluation processes or with corresponding scanners or reading devices.

Whereas, in the case of bar codes, which are printed, both different bar widths and different widths of the empty spaces are used, in the case of coding by means of mask lasers the possible sites of the coding elements or dots are arranged in a grid. With this process, the digits are represented in the dual system, i.e. no dot (non-dot) corresponds to zero, and when present a dot corresponds to one. To date, in Germany plastic drinks bottles have been coded by means of such a code, a 28 or 30-bit being used, and the time of manufacture, manufacturer, and bottle type being shown by the code.

When coding by means of a mask laser, a laser pulse is used to etch into the material of the multi-trip receptacle, e.g. the wall of a PET multi-trip bottle a coding element or dot of a size which is established by the dimensions of the laser pulse. The dimensions of the laser pulse depend on the mask used. Mask lasers have a specific maximum shooting or pulse frequency of for example 100 Hz, i.e. two successive laser pulses must have a specific minimum interval between them, 10 ms in the chosen example. This maximum limit of the pulse frequency results from the time required to charge the capacitors of the flashlamps which pump the active material. The multi-trip receptacles to be provided with the code are moved past the mask laser at a specific speed, and the minimum interval between the dots is the speed of the multi-trip receptacles divided by the maximum pulse frequency of the mask laser. With the known coding processes operating with mask lasers, the positions in which coding elements can be placed are arranged in a grid which corresponds approximately to this minimum interval. The grid can also be larger, but not smaller.

The object of the invention is also to create a code which is particularly suitable for the system for managing a large number of multi-trip receptacles, in particular if the multi-trip receptacles are plastic bottles.

This object is achieved according to the invention in that no coding element is placed in at least one grid position between two grid positions in which coding elements (dots) are placed.

Because a grid position must thus remain free after a dot, i.e. a further dot can be placed only in the next-but-one grid position, the grid can be narrower than with the conventional processes operating with mask lasers. If at least one grid position remains free after a placed dot, the grid can amount to half the above-mentioned minimum interval between grid positions as established by the laser pulse frequency. In other words: Within this digit, information is stored not only through the presence or absence of a dot, but also through its absolute position relative to the front edge of the digit. More values can thereby be coded than would be possible with a fixed structure.

If two grid positions are left free after a placed dot, the grid can amount to a third of this minimum interval, etc. Which value makes most sense in the individual case depends on the clarity of the outline of the placed dots and the accuracy with which the dots can be placed. Furthermore, the accuracy with which the code can be read upon decryption is to be taken into account. In the following, it is assumed that after each placed dot, only the following grid position must remain free.

The width of the coding elements can be greater or smaller than the grid or equal to the grid. Preferably, the width of the coding elements or dots is greater than the grid, e.g. by 30%. Despite this relatively large width of the dots, they can be distinguished without difficulty, as no dot can be placed in the grid field following a placed dot, so that this field is free and the dot placed in the preceding grid field can therefore also occupy the start of this field. Because a further dot may be placed only in the next-but-one field, the combinations of dots and non-dots are admittedly restricted, but on the other hand the grid can be smaller This code is therefore less suitable for representing digits in a dual system.

Preferably, the mark is a continuous numbering of the multi-trip receptacles. Several grid fields, in the following two in each case, form a module and two or more modules are used to represent one digit of the numbering. The module width results in the specific case from the transport speed of the multi-trip receptacles divided by the pulse frequency of the laser.

Preferably, the digits are reproduced in the duodecimal system. Two grid widths form one module each and three modules are used to reproduce a digit of the duodecimal system. Five dot positions are then available to reproduce one digit. The sixth dot position must remain free, i.e. a non-dot must be present there, as a dot would extend into a module of the next digit, which is to be avoided. There are thus five possible positions for a single dot within the three modules which are used to reproduce a digit. There are six possible positions for two dots, it being necessary to take into account that the second dot can stand at the earliest at twice the grid interval or one module away from the first, as both would otherwise overlap. Finally, there is only one possible position for three dots within three modules. There are therefore twelve positions available in total, so that this code is suitable for use in the duodecimal system.

Preferably, the number of grid positions in which no coding elements are placed between two placed coding elements (free grid positions) is limited. The coding of a digit by nothing but non-dots is therefore waived, i.e. each digit value is coded with at least one dot. The maximum gap between two dots is thereby limited, thus facilitating machine-readability of the code. The reading of the code can be synchronized only to placed dots. The most unfavorable case occurs when a digit which is reproduced by a dot in the first position of the first module is followed by a digit which is reproduced by a dot in the third module—necessarily in the first position of this module. The gap between the two dots has a width in this case of 4.5 modules or 9 grid positions.

This means in summary: On condition that the next dot may be set at the earliest at an interval of one module after a dot, i.e. in the next-but-one grid field, five dot positions result in total within the three modules, and digits of the values 0 to 11 can be represented. In the case of dots the width of which is greater than the grid, a dot is in the last of the three modules placed only at the start of the module, as a dot in the last grid field could otherwise overlap with a dot in the first grid field of the following digit.

To reduce the maximum number of the successive positions in which no coding element is placed, an additional coding element is placed preferably in the second position of the last module (last grid field) of a digit whenever no coding element is placed in the first position of the first module of the next digit. The number of free grid positions can thereby be limited to 5.

Depending on the size of the pool of multi-trip receptacles that is to be managed, the code consists of 8, 9 or 10 digits which are represented in the duodecimal system.

Preferably, the coding of the multi-trip receptacles is applied by means of a mask laser. Such a laser has a pre-set maximum pulse frequency. The multi-trip receptacles are moved past the mask laser at such a speed that double (triple etc. n-times) the width of a grid position is approximately equal to this speed divided by the maximum pulse frequency. A coding element set by a laser pulse is then followed by at least one (two, etc. n−1) grid positions in which no coding element is placed.

When reading or scanning the code mark, the overall length of the code is firstly established, i.e. the distance between start and stop bits. These always have the value 1 in a dual code and are, in the code according to the invention, a dot in the first position of the first module.

It is then determined from the length of the code whether the code consists of 8, 9 or 10 digits. Each digit is composed of 3 modules so that, by dividing up the overall length of the code, the positions of the individual modules can be established. The front edge of the dot can either be aligned with the start of the module or be offset by half the module width, the dot then extending past the end of the module somewhat into the next module, or the module can be free.

With 8 digits for which 33 modules are required including the start and stop bits and the usual check bits, 400 million ($12^8$) containers can be identified. With 9 digits, and correspondingly 36 modules, 5 billion ($12^9$) containers can be identified. The code would thereby be suitable for example for managing the pool of 1-litre GDB bottles in Germany.

The advantage of this code is in particular that with a pre-set type of module, a larger numerical range can be represented than in a dual system. However, the code requires a somewhat increased reading accuracy.

BRIEF DESCRIPTION OF THE DRAWINGS

An embodiment of the invention which relates to plastic multi-trip bottles is explained in detail in the following using the drawing. It is shown in:

FIG. 4 the placing of an additional dot in the last module of a digit in order to shorten the empty space;

FIG. 5 the placing of an additional dot for the check bits and

FIG. 6 the formation of the check bit.

FIG. 7 the representation of the digits 0 to 3 in the quadral system.

DETAILED DESCRIPTION

Figure 1:
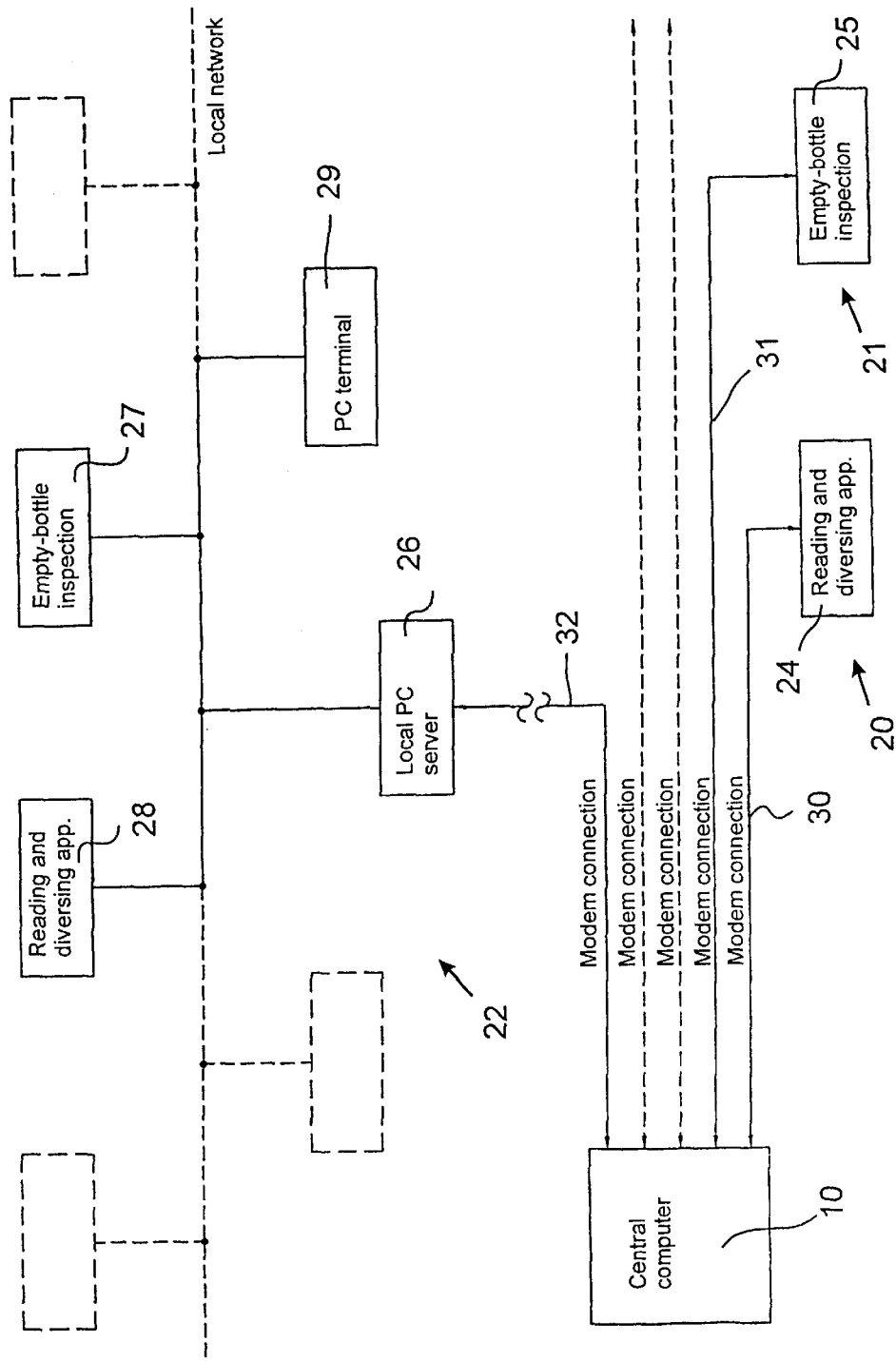
FIG. 1 in a schematic representation, the system for managing a pool of reusable drinks bottles.

The system for managing a large number of reusable drinks bottles comprises a central station 10 and a number—three in the embodiment shown—of local stations 20, 21, 22.

The central station 10 consists essentially of a computer and can be connected via modem connections 30, 31, 32 to each local station 20, 21, 22 in order to exchange data with them.

In the case of the local stations 20, 21, the modem connection 30, 31 is created directly with a reading and diversion apparatus 24 or an empty-bottle inspector 25, while in the case of local station 22 the modem connection 32 runs via a local PC server 26. An empty-bottle inspector 27 and a reading and diversion apparatus 28, a PC terminal 29 and further apparatuses are connected to the PC server 26 via a local network 33.

The drinks bottles are coded on the base with a 32-bit code. The code of the bottles passing through and, allocated to this, the current date, a code for the local station, the reading apparatus and the bottled drink are firstly stored in the local station 20, 21, 22 in a data memory of the reading and diversion apparatus 24, the empty-bottle inspector 25 or the PC server 26. Once a week the modem connection 30, 31 32 is set up and these data are transmitted to the central station 10. If the transmitted data relate to new bottles, this is additionally indicated or noted. The data are evaluated in the central station by calculating the number of cycles and the age of the bottle from the data stored for each bottle, allocated to its code. The codes of those bottles in which the number of cycles or the age exceeds a preset limit are recorded in a file. This file is transmitted to the local stations 20, 21 22 on creation of the respective modem connection 30, 31 32. The transmitted file is stored in the reading and diversion apparatuses 24, 28 and each read code of the bottles passing through is compared with the codes listed in this file. If the code of a bottle which is just passing through is in this file, the bottle is diverted.

Upon the next modem connection, the central station 10 is then informed that the bottle with this code has been diverted and through which local station 20, 21, 22 the diversion took place.

The data are then evaluated in the central station 10 to discover which local station 20, 21, 22 has supplied how many new bottles and removed old bottles and how many bottles it has used i.e. filled. The manufacturing, disposal and running costs of the bottles in the pool are then distributed amongst the member companies of the pool according to an agreed ratio.

An embodiment of the code which is particularly suitable for the system according to the invention is described below.

Code specification for a standard 1.0-litre mineral-water bottle made of PET:

Aims:

All bottles of this type are to be identified by a consecutive number. This serves as a basis for managing the bottle pool. The number range to be coded must contain a container quantity of at least 4 billion bottles. If at all possible, the manufacturer's coding machines are to be used.

Definitions:

Code length: Is the length of the entire code, defined as the interval between start and stop bits, and is given as an angle in [°].

Module: Is the area of a possible writing process.

Module width: Is the smallest width of a writing process. This is dependent on the maximum laser frequency and the rotation speed of the bottles. The module width is given as an angle in [°].

Digit: A digit is a constituent of the bottle number and consists of three modules.

Bottle number: Is the number or figure to be coded. It consists of n digits.

Dot: Is the region of the module which is covered by the laser mask.

Code Description:

General:

The check bits as well as the start and stop bits occupy one module per bit as usual. In the case of the digit, three modules are always packed together. Within this digit, information is stored not only through the presence of a dot, but also through its absolute position relative to the front edge of the digit. In this way, more values can be coded than would be possible in the case of a fixed structure. The value range which can be coded within a digit is the basis of the number system.

The bottle number is variable in length and can be increased or decreased by one or more digits. Thus, if the planned pool size is exceeded in the future, it can be extended. In addition, in the first year, coding can be carried out with one less digit, which facilitates the resetting of the coding machines.

Partitioning of the Code:

Preferably, the code is a continuous numbing of the multi-trip receptacles. Several grid fields (e.g., two as shown in FIG. 7) form a module and two or more modules are used to represent one digit of the numbering. The module width results in the specific case from the transport speed of the multi-trip receptacles divided by the pulse frequency of the laser.

Within a digit, the dots can be offset by a half module width. 5 shooting positions are thereby available within a digit. As can be seen from FIG. 3, the values 0 to 11 can then be coded. Thus the number system for the bottle numbers has the base 12. To keep to the writing frequency of the laser coding machine, the next writing pulse can come at the earliest after one module. Therefore, in the last module, writing takes place only at the beginning of the module.

In order to improve the reading of the code, the gap between two dots must be limited. Therefore each value of a digit is coded by at least one dot. The most unfavourable case occurs if a digit which has the value 0 is followed by a digit which has the value 4. The gap between two dots is then 4.5 modules wide.

FIG. 4 shows a possibility for further shortening possible gaps: Whenever the successive digits allow it, i.e. when no dot is placed in the first position of the following digit, a dot is written in the last position of a digit. This is the case in example 1 of FIG. 4. In example 2 of FIG. 4, on the other hand, no dot is placed in the last position of the digit n, as a dot is already placed in the penultimate position.

Figures 2, 3:
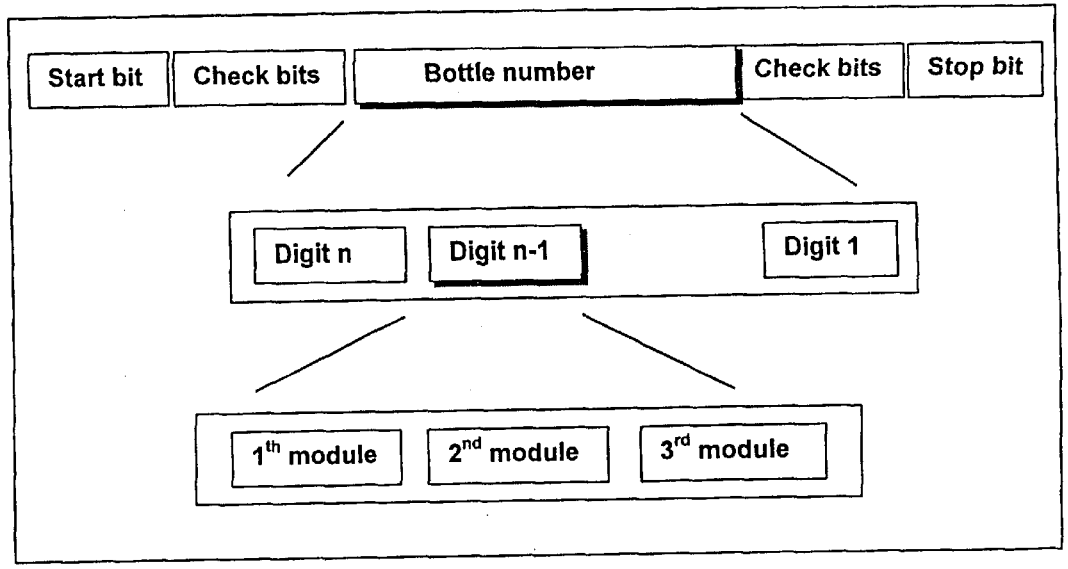
FIG. 2 the structure of the code.
FIG 3 the representation of the digits 0 to 11 in the duodecimal system.

In the digit representation according to FIG. 2, the following therefore applies; If a digit with the value (0;1;2;3;5;6;8) is followed by a digit (1;2;3;4;8;9;10), a dot is placed in the sixth position.

Code length definition for variable lengths:

The code length serves for recognition of the code type.

|  | Number of modules | Module width | Code length | Base | Number of digits | Numbers range from | to |
|---|---|---|---|---|---|---|---|
| Code A | 30 | 4.2° | 126.00° | — | — | — | |
| Code B | 30 | 5° | 150° | 12 | 8 | 0 | 429, 981, 695 |
| Code C | 33 | 5° | 165° | 12 | 9 | 429, 981, 696 | 5, 589, 762, 047 |
| Code D | 36 | 5° | 180° | 12 | 10 | 5, 589, 762, 048 | 67, 507, 126, 271 |

Code A: This code is the code currently used for the 1-liter GDB bottle
Code B: This code is a number code which could be used to begin with in order to keep down the conversion costs of the coding systems.
Code C: Code C is code B extended by one digit. It can thus cover the required value range of 4 billion bottles.
Code D: This code would be for a future extension which would possibly also involve modifications to the reading and diversion systems.

Codes B to D each contain a start bit, a stop bit and four check bits.

Code Monitoring:

Errors during coding can largely be excluded by a reading device during manufacture. Thus, only errors due to scratching and contamination need be expected.

Within a digit, there are five free positions for the dots, however not all combinations are used. This redundancy as well as the monitoring of the width of the dot can be used by the reading apparatus to isolate an error and optionally correct it using the check bits. The recognition of an error is more important than the reorganization of a defective code, as incorrectly reorganized codes would lead directly to errors in the data bank. An exclusive use of the modified Hamming process is therefore not sufficient.

Partitioning of the Check Bits:

Of the four check bits C1 to C4, two are written behind the start bit and two in front of the stop bit. Thus the maximum interval between two successive dots remains small.

The procedure for the space between check bits and digit is as for the space between two digits. Pos. 6 of C2 or of the last digit is written whenever there is room. In example 1 of FIG. 6, a dot is therefore placed in the $6^{th}$ position of check bit C2 and of the last digit, whereas in example 2 of FIG. 6, no additional dots are placed.

Formation of the Check Bits:

The check bits are formed with all digit comprehension over all writing positions. There are six possible positions per digit. The grey areas in the diagram of FIG. 6 show which positions are used for calculating the corresponding check bits C1 to C2. For the calculation, the following applies:

C1=total (1,2,3,7,8,9, . . . )
C2=total (1,4,5,7,10,11 . . . )
C3=total (2,4,6,8,10 . . . )
C4=total (3,5,6,9,11,12, . . . )

All check bits are modulo 2 of the sum.

Reorganization in Case of Error:

Within a digit, there are five free positions for the dots, however not all combinations are used. This redundancy as well as the monitoring of the width of the dot can, upon reading the code, already ascertain the place at which the code was disturbed. Using the check bits, a disturbance of at most three writing positions can be corrected.

List of Reference Numbers

| 10 | Central statlon |
|---|---|
| 20, 21, 22 | Local station |
| 24 | Reading and diversion apparatus |
| 25 | Empty-bottle inspector |
| 26 | PC server |
| 27 | Empty-bottle inspector |
| 28 | Reading and diversion apparatus |
| 29 | PC terminal |
| 24 | Empty-bottle inspector |
| 30, 31, 32 | Modem connection |
| 33 | Network |

What is claimed is:

1. A system for managing a large number of reusable multi-trip receptacles for a product, the multi-trip receptacles being used in a number of use cycles, the system comparing:

each of the receptacles being marked by a code in an identifiable manner, a plurality of local stations separated from each other, each local station including means for reading the code and means for recording data for each individual receptacle passing through a local station;

a central station;

means for transmitting the data from the local stations to the central station;

means for storing the data which have been recorded in the local stations for the individual receptacle in allocation to the read code of that receptacle in the central station, means for evaluating the data stored in the central station to establish the number of cycles the receptacle has been used; and when a certain number of cycles is reached, the local stations being informed that the relevant receptacle is no longer to be used.

2. The system according to claim 1, wherein the age of each multi-trip receptacle is established from the data stored in the central station and, when a certain age is reached, the local stations are informed that the relevant receptacle is no longer to be used.

3. The system according to claim 1, wherein the data stored, allocated to the code of each multi-trip receptacle, contains information about at least one of the following items:

a date of manufacture;

a manufacture;

the products filled in;

a date on which the multi-trip receptacle was recorded in the local stations;

a local station in which the multi-trip receptacle was used for the fist time;

the stations in which the multi-trip receptacle was recorded; and the number of uses of the multi-trip receptacles concerned in a local station.

4. The system according to claim 3, wherein the data stored in the central station are evaluated for at least one of the following operations:

recording according to manufacturers;

recording according to contents;

tracking the life-cycle;

establishing the plant which introduced a particular multi-trip receptacle, and the number of multi-trip receptacles introduced by a particular plant, establishing the plant which removed and destroyed a particular multi-trip receptacle, and the total number of these multi-trip receptacles;

monitoring destruction; and monitoring the pool for foreign multi-trip receptacles which have been smuggled in.

5. A code, in particular for a system for managing a large number of reusable multi-trip receptacles, each of which is marked by a code in an identifiable manner, wherein the code is a continuous numbering of the multi-trip receptacles with two successive positions forming a module, and at least two modules being used to represent a digit of the numbering, the code comprising:

coding elements placed only in positions arranged in a grid, wherein directly after each position in the grid in winch a coding element is placed, at least one position in the grid follows in which no coding element is placed.

6. The code according to claim 5, wherein the numbering takes place on the basis of the duodecimal system and three modules are used to represent a digit.

7. The code according to claim 5, wherein the width of the coding element is greater than the width of the grid.

8. The code according to claim 7, wherein to reduce the maximum number of the successive positions in which no coding element is placed, an additional coding element is placed in the second position of the last module of a digit provided that no coding element is placed in the first position of the first module of the next digit.

9. The code according to claim 5, wherein the number of free grid positions between the two placed coding elements does not exceed a pre-set maximum value.

10. The code according to claim 9, wherein the preset maximum value is five.

11. A process for coding multi-trip receptacles by means of a code, comprising:

setting the coding elements by means of a mask laser having a predetermined maximum pulse frequency; and moving the multi-trip receptacles past the mask laser at such a speed that the width of n grid positions is approximately equal to this speed divided by the maximum pulse frequency, so that a coding element set by a laser pulse is followed by at least n−1 grid position in which no coding element is placed.

* * * * *

UNITED STATES PATENT AND TRADEMARK OFFICE
CERTIFICATE OF CORRECTION

PATENT NO. : 6,732,921 B1
DATED : May 11, 2004
INVENTOR(S) : Heuft et al.

It is certified that error appears in the above-identified patent and that said Letters Patent is hereby corrected as shown below:

<u>Title page,</u>
Item [73], Assignee, should read -- Heuft Systemtechnik GmbH, Burgbrohl (DE) --.

Signed and Sealed this

Tenth Day of January, 2006

JON W. DUDAS
*Director of the United States Patent and Trademark Office*